United States Patent [19]
Strain

[11] Patent Number: 4,536,198
[45] Date of Patent: Aug. 20, 1985

[54] MOISTURE CONTROL DEVICE
[75] Inventor: Don R. Strain, Clarkston, Mich.
[73] Assignee: Hydro-Dri Systems, Inc., Southfield, Mich.
[21] Appl. No.: 560,778
[22] Filed: Dec. 12, 1983

Related U.S. Application Data

[63] Continuation-in-part of Ser. No. 441,354, Nov. 15, 1982, , which is a continuation-in-part of Ser. No. 259,121, Apr. 30, 1981, Pat. No. 4,419,835.

[51] Int. Cl.³ ............................................. B01D 53/04
[52] U.S. Cl. ..................................... 55/33; 55/62; 55/74; 55/162; 55/179; 55/208; 55/387
[58] Field of Search ................... 55/18, 20, 21, 25, 26, 55/31, 33, 35, 62, 74, 161–163, 179, 180, 208, 387

[56] References Cited
U.S. PATENT DOCUMENTS

| 2,101,555 | 12/1937 | Moore et al. | 55/179 X |
| 2,237,684 | 4/1941 | Moore | 55/31 X |
| 2,328,521 | 8/1943 | Wittmann | 55/33 X |
| 2,376,095 | 5/1945 | Shoeld | 34/80 |
| 2,563,042 | 8/1951 | Jaubert | 34/80 |
| 2,735,507 | 2/1956 | Vogel | 34/80 |
| 2,738,592 | 3/1956 | Stanley | 34/80 |
| 2,773,313 | 12/1956 | O'Connor | 34/80 |
| 2,944,627 | 7/1960 | Skarstrom | 55/179 X |
| 3,193,985 | 7/1965 | Siggelin | 55/33 |
| 3,231,512 | 1/1966 | Harter | 55/33 X |
| 3,304,623 | 2/1967 | Reiss et al. | 34/80 |
| 3,355,860 | 12/1967 | Arnoldi | 55/33 X |
| 3,803,724 | 4/1974 | Bombich | 34/80 |
| 3,827,218 | 8/1974 | Settlemyer | 55/179 |
| 4,419,835 | 4/1981 | Strain | 55/179 X |

FOREIGN PATENT DOCUMENTS

| 393586 | 6/1933 | United Kingdom | 55/179 |
| 709138 | 1/1980 | U.S.S.R. | 55/208 |

Primary Examiner—Robert H. Spitzer
Attorney, Agent, or Firm—Cullen, Sloman, Cantor, Grauer, Scott & Rutherford

[57] ABSTRACT

A moisture control device for drying air, having an enclosed housing including an inlet and at least one restricted outlet. Contained within the housing, in between and on opposite sides of the inlet and outlet, are first and second desiccant columns, each containing a desiccant material. An inlet plenum is located between the inlet and the desiccant columns, and the discharge plenum is located between the restricted outlet and the desiccant columns, with the inlet and discharge plenums communicating through the desiccant columns. A valve damper is pivotally supported within the inlet plenum having one end extending across the inlet to alternately direct air into the housing by a blower into one of the desiccant columns. Pivotal exhaust doors are actuated by the damper to direct dry air into the opposite desiccant column, regenerating that column, before exhausting the air out of the housing. An intermittently operable time controlled motor pivots the damper before the desiccant approaches saturation and before the desiccant loses its heat of absorption. A heater is located within each desiccant column for raising the temperature of the dry air as it enters the column so that regeneration time equals absorption time. At least one heat collecting baffle assembly is interposed between each heater and the discharge plenum to prevent radiation of heat thereto.

23 Claims, 2 Drawing Figures

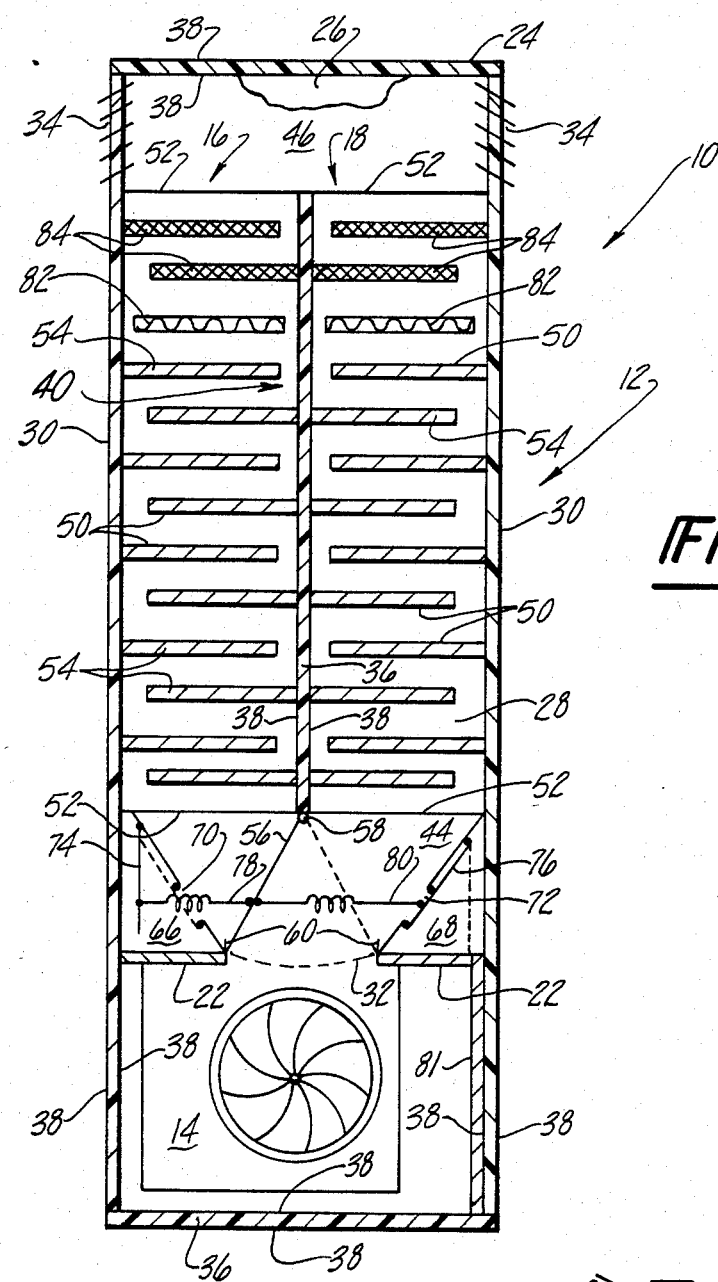
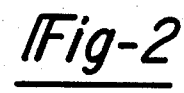
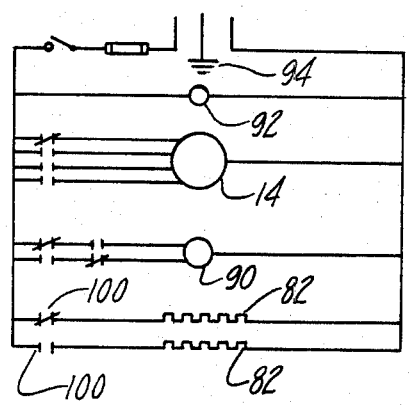

MOISTURE CONTROL DEVICE

Present application is a continuation-in-part of application Ser. No. 441,354, filed Nov. 15, 1982, which is a continuation-in-part of application Ser. No. 259,121, filed Apr. 30, 1981 now U.S. Pat. No. 4,419,835 issued Dec. 13, 1983.

BACKGROUND OF THE INVENTION

The present invention relates generally to moisture control devices and more particularly, to dual column, solid desiccant dehumidifiers and dehydrators which may or may not be used in combination with central heating/air conditioning systems. Conventional apparatus of this type normally include an air blower and a source of heat applied to the column being regenerated. Ambient air always includes an existing water load which it is sometimes desirable to minimize in order to increase the shelf life of certain products, increase the comfort level in a controlled space or to save energy when cooling is necessary.

A hair dryer having two desiccant units, connected to a blower and a damper means alternately providing communication between one of the desiccant units with a conduit to a hair dryer hood. A portion of the heated, dry air is alternately directed through the other desiccant unit to regenerate such desiccant unit. During the regeneration process, a heating element is required to heat the desiccant material to facilitate regeneration of the desiccant material, as illustrated, for example, in U.S. Pat. No. 3,304,623.

It has also been conventional to furnish dryers with a desiccant material as illustrated in U.S. Pat. Nos. 2,773,313; 2,738,592; 2,735,507; 2,563,042; and 2,376,095.

Additionally, it is known to provide a dual chambered gas dryer with a by-pass valve to regenerate an alumina desiccant material by recycling part of the air through one of the dual chambers, as illustrated in U.S. Pat. No. 3,803,724.

The prior commercial drying apparatus have several disadvantages as follows: first, the desiccant material in the desiccant units is generally densely packed, and the units have a long cycle time, i.e., from 30 minutes to several hours before alternating from the drying to regeneration cycle. This necessitates a large amount of desiccant material, increasing the unit cost. Further, the long cycle time causes the desiccant to become less and less efficient, as the desiccant approaches saturation, reducing the drying capability of the unit. The long cycle time also allows the heat of adsorption to dissipate from the desiccant material, wasting energy and necessitating the addition of heat energy to regenerate the desiccant. In addition, the heat necessary to regenerate the desiccant material may put heat into the controlled space which would increase the amount of energy required for cooling. Further, prior apparatus heated the desiccant directly by placing heaters in the desiccant material or by heating the ambient air before the existing water load was removed, both methods requiring substantial amounts of energy. Finally, the relatively large pressure drop associated with densely packed desiccant units, requires a costly high powered blower operating at high static pressure to move the air through the unit, further increasing the size and cost of the dryer.

The present invention is directed to a moisture control device which eliminates the foregoing problems encountered in removing the existing water load from ambient air.

SUMMARY OF THE INVENTION

The present invention provides a new approach to reducing moisture for dehumidifying or dehydrating ambient air. Specifically, according to the principles of the present invention, ambient air is alternately and intermittently directed through one of a pair of desiccant columns at low static pressure. The ambient air is rapidly cycled to the second or alternate desiccant column before the desiccant contained within the first desiccant column reaches saturation and before it loses the heat of adsorption. A portion of the dried air is directed through the second desiccant column, regenerating the desiccant material contained therein. A pair of resistance heaters is preferrably used to warm the dried air as it enters the appropriate column for regeneration so that adsorption time equals regeneration time, while preventing the heaters from raising the temperature of the controlled space. After the regeneration air leaves the desiccant column it is moisture laden and is exhausted outside of the controlled space.

An important feature of the invention is to provide a moisture control device for reducing the amount of water load present in the ambient air of a controlled space or the air used to cool a controlled space, which involves passing the air to be treated through a plurality of spaced desiccant baffle assemblies, each containing a water adsorbant desiccant and thereafter discharging the dried air into the controlled space or cooling unit, thus, efficiently lowering the relative humidity of the controlled space and reducing the amount of energy required to cool the controlled space. The desiccant baffle assemblies, which contain loosely-packed desiccant material, create a low pressure drop providing sufficient air flow at low static pressure. An additional feature is to prevent the heat required to allow adsorption time to equal regeneration time from raising the temperature of the controlled space. A further feature in rendering the ambient air more hygroscopic by removing the existing water load, is an allowable increase in the controlled space temperature to effect the same comfort level, which provides cooling energy savings.

A further feature of the invention is to employ, alternately, one of the pair of desiccant columns defining passages to remove the moisture in the existing ambient air in a continuous regenerative system, whereby the heat of adsorption is retained in the columns by rapid cycling. By rapid cycling between the columns, the desiccant material in each column is not allowed to reach more than approximately thirty percent of its saturation load, preferably ten percent, and the retained heat of adsorption is the exact amount of energy required to regenerate the desiccant material contained in the column without additional heat energy.

A further feature of the invention includes application of heat to the dried regeneration air before it passes over the partially saturated desiccant increasing its capacity to absorb moisture from the desiccant. The heating of the dry air is energy efficient, since no energy is used to heat the original water load which was removed with the passage of the air over the desiccant material. The capacity of the heated dry air for absorbing water has been increased. The slight warming of the dry air is required to have regeneration time equal adsorption time in a rapid cycling system with no other impetus.

An additional feature includes beginning the application of the heat to the portion of dried air used for regneration five seconds after regeneration has begun. This allows time for the dynamic columns of air to change direction avoiding the transfer of heat to the discharge plenum and the dried air contained therein. The heater remains on and is turned off approximately thirty seconds before the end of regeneration to allow the desiccant column to cool down.

The low pressure requirements of the moisture control device of the present invention permits the use of a low pressure blower. The low pressure drop allows the system to operate at a low static pressure, approximately 0.9 inches of water. Ambient air delivered from an inlet plenum passes through one of the desiccant columns into a discharge plenum having at least one restricted outlet for the delivery of dry air therefrom. The restricted outlet produces a back pressure in the discharge plenum, whereby a portion of the total air flow, approximately ten to twenty percent, is recycled in a reverse direction, through a second column for passing the spaced baffled assemblies of the second desiccant column, regenerating the desiccant material within the baffles before exhausting to atmosphere outside the controlled space.

A further feature of the present invention includes the use of a valve means, such as opposed pivotal exhaust doors, in combination with a valve damper. The doors are actuated by the valve damper, which is adapted for movement between a first and a second position, such that the valve damper controls the direction of slightly pressurized air from the inlet plenum to one of the desiccant columns. In either position, one of the pivotal doors is closed and the other is open, so that a portion of the air returning from the discharge plenum, is recycled in the opposite direction, over the other of the two desiccant columns for regenerating the desiccant material therein, before exhausting to atmosphere.

There is further employed a damper actuating means, such as a multi-switch cam timer and a reversible motor, for relatively rapid cycling, approximately 2.5 minutes per column or five (5) minutes for a full cycle. By rapid cycling, the heat of absorption is retained in the desiccant to facilitate regeneration of the desiccant material and provide much drier air since the desiccant only approaches thirty percent saturation, preferably ten percent saturation. Thus, rapid cycling greatly reduces the amount of desiccant required, thereby reducing the cost of the moisture control device.

These and other objects will be seen from the following specification and claims in conjunction with the appended drawing.

DESCRIPTION OF THE DRAWING

Various objects, benefits and advantages of the present invention will become more apparent upon reading the following decription in conjunction with the drawing where like reference numerals identify corresponding components.

FIG. 1 is a front perspective view of the moisture control device in accordance with the present invention; and FIG. 2 is an electrical circuit diagram of the device.

DESCRIPTION OF THE PREFERRED EMBODIMENT

The moisture control device of the present invention, generally designated 10, includes an enclosed housing 12, blower 14, and opposed first and second desiccant columns or beds 16 and 18. In the disclosed embodiment, a moisture control device is shown for use in dehumidifying various enclosures, but it should be appreciated that the present invention may be utilized in combination with central heating or air conditioning systems wherein the device is positioned within the cold air return and the air is sucked through the device eliminating the need for blower 14. It should also be appreciated that the present invention may be utilized in a reverse mode, whereby the heat and moisture being exhausted from a controlled space can be reclaimed to precondition the incoming makeup air.

As illustrated, housing 12 has a front wall 22, rear wall 24, top wall 26, bottom wall 28 and two side walls 30. Front wall 22 includes an air inlet 32 and rear wall 24 or side walls 30 include at least one restricted dry air outlet 34. In the illustrated embodiment outlets 34 are positioned within side walls 30. While housing 12 has been shown for ease of illustration of unitary construction, it is contemplated that the device may utilize a modular construction concept to facilitate fabrication, assembly and service of the device of the present invention. Heat transfer to the controlled space is minimized by insulating the entire device with one-half inch fiberglass 36, sandwiched between metal skins 38.

An insulated vertical partition 40 is spaced inwardly of rear wall 24 and front wall 22, respectively, extending between the top and bottom walls 26, 28, defining within housing 12 opposing first and second desiccant columns or beds 16 and 18 on each side of air inlet 32 and restricted dry air outlet 34. Partition 40 is insulated to minimize heat transfer by, for example, sandwiching one-half inch fiberglass 36 between metal skins 38. An inlet plenum 44 communicates with inlet 32, and a discharge or outlet plenum 46 communicates with restricted outlet 34, see FIG. 1.

A plurality of transverse longitudinally spaced laterally staggered desiccant baffle assembles 50 are mounted within first and second desiccant columns 16, 18 and spaced along the length of each column. As illustrated, the baffle assemblies 50 are laterally aligned and are alternatingly arranged within each desiccant column 16, 18 so that the ends of the respective baffle assemblies 50 alternately engage side walls 30 and partition 40. This minimizes pressure drop while providing good contact between the air and desiccant by providing a tortuous path for air movement through the columns. Inlet plenum 44 and discharge plenum 46 communicate through first and second desiccant columns 16, 18, by way of openings 52, see FIG. 1.

While the above construction for desiccant columns 16 and 18 has been shown for illustration as the preferred embodiment, it is contemplated that these columns may be formed in any other matter such as disclosed in my U.S. patent application Ser. No. 441,354 entitled "Drying Device", filed Nov. 15, 1982, the disclosure of which is hereby incorporated by reference.

Baffle assemblies 50, in the disclosed embodiment, are constructed of wire screening 54, for example ⅛ inch mesh aluminum wire containing loosely packed desiccant. A suitable desiccant is activated aluminum oxide, referred to as alumina, in the form of beads or pellets having a size which would not pass through a screen mesh of 0.125 inches. To facilitate the fabrication and packaging of baffle assemblies 50 and to provide structural integrity when utilizing the modular construction concept, assemblies 50 are made in three equal pieces, with each piece sized to fill one-quarter of the cross-sectional area of columns 16 and 18.

While other desiccants may be employed, such as silica gel, it is contemplated that the preferred desiccant is a porous aluminum oxide in the form of beads to facilitate the passage of ambient air over and through the baffle assemblies 50.

A valve damper 56 is pivotally mounted, within inlet plenum 44, to partition 40 by pivot hinge 58. Damper 56 has one end extending across inlet 32, directing ambient air received from inlet 32 into one of the desiccant columns, 16, 18 in a first pivotal position and into the other column in a second pivotal position. Stop 60, attached to front wall 22 on each side of inlet 32, limit the degree of pivoting of damper 56. An intermittently operable power means, such as a motor 90, pivots damper 56 between its first and second positions to alternately and intermittently direct air into desiccant columns 16 and 18.

In the disclosed embodiment, the motor 90 is a Dayton Four rpm permanent split capacitor brake gear motor. The motor is connected into an electrical power circuit, which includes multi-switch cam timer 92 and a power source 94, see FIG. 2. The timer in this embodiment is an Industrial Timer Company five minute repeat cycle, four-switch cam timer. The particular time cycle will depend on several factors including the amount of air flow, size of desiccant columns, water load in the air to be processed, and dynamic capacity of the desiccant. In general, the faster the cycle, the drier the discharge air will be.

Formed within inlet plenum 44 are first and second exhaust plenums 66 and 68. Each communicates with inlet plenum 44 by way of exhaust outlets 70 and 72, and adjacent openings 52 of first and second desiccant columns 16 and 18. A pair of spaced pivotal exhaust doors or closures 74 and 76 are pivotally connected to opposite ends of inlet plenum 44 within exhaust plenums 66 and 68, respectively. One door 76 in a first position normally closes exhaust outlet 72. The other door 74 in its first position is normally open and is adapted in its second position to close exhaust outlet 70.

A pair of substantially parallel spring links 78 and 80 are pivotally connected at their ends to opposite sides of valve damper 56 and at their outer ends are pivotally connected to their respective exhaust doors 74 and 76.

FIG. 1 shows the respective doors in their first position. The doors are adapted for movement in unison to their second position such as shown in dashed lines.

As schematically shown in FIG. 1 an air blower 14 is connected to inlet 32 and inlet plenum 44. A suitable air blower is a Dayton direct drive, four-speed blower adapted to selectively deliver ambient air from approximately 940 cubic feet per minute to 1260 cubic feet per minute at a static pressure of 0.9 inches of water. It is contemplated that a single speed motor may also be employed. An intake air filter 81 is provided at the intake to blower 14.

A pair of heat strips 82 are positioned within each desiccant column 16 and 18 in the path of movement of dry air therethrough and is adapted to heat the dry regenerating air passing into each column. Each strip is capable of delivering at least 1500 watts when energized. The heaters 82 are interposed in a circuit which includes cam timer switches 100 connected to power source 84, see FIG. 2.

The principal purpose of heaters 82 in the disclosed device of this invention is to provide that adsorption time equals regeneration time. The infrared radiation from heaters 82 is prevented from entering discharge plenum 46 by interposing between heaters 82 and discharge plenum 46, heat collecting, reflecting or insulating baffle assemblies 84 containing, for example, heat collecting material such as activated carbon. The carbon baffles 84 effectively collect the radiant heat. The rapid cycling, coupled with a cool down period preferably about thirty seconds, just prior to cycling, prevents the carbon baffles 84 and desiccant baffles 50 from transferring heat into the discharge plenum 46. After the cycle is initiated, there is a five second delay before turning on the corresponding strip heater 82 to allow time for the dynamic columns of air to change direction, thereby avoiding the transfer of heat to discharge plenum 46 during changeover. In addition, heaters 82 are turned off approximately thirty seconds before the end of the cycle to allow the column to cool down and avoid the transfer of heat to discharge plenum 46.

The activated carbon serves another very useful purpose by effectively removing odors and smoke from the processed air. This effectiveness will be diminished in time so that the carbon will need to be replaced or manually regenerated. However, the carbon's efficiency in collecting radiant heat will not be affected.

It will be understood that the heaters 82 reduce the regeneration time requirements of the desiccant making the device more efficient. It has also been found that the elimination of the heaters in the disclosed embodiment will eventually result in the loss of regeneration capacity. The preferred embodiment therefore includes the heaters in each desiccant column. The prior apparatus, however, require direct heating of the saturated desiccant material, which requires substantially more energy.

When the present device is utilized as a dehumidifier or for providing dry air to the inlet of an air conditioner, the respective exhaust outlets 70 and 72 are extended through a building or room wall. Thus, the dried air picks up water during regeneration of the desiccant and is exhausted to the outside of the room or building wall maintaining low humidity within the controlled space.

Operation

As illustrated in FIG. 1, blower 14 blows ambient air at relatively low static pressure through air inlet 32 into inlet plenum 44. Damper 56, in a first position, directs ambient air into second desiccant column 18 and through desiccant baffle assemblies 50 contained therein removing the existing water load by adsorption. Exhaust outlet 72 is closed forcing all of the air flow through second desiccant column 18. Dry air flows out of second desiccant column 18 into discharge plenum 46.

Restricting outlets 34 create a differential pressure or back pressure within plenum 46, which causes a portion of the dry air therein to flow through the first desiccant column 16 in the opposite direction to the flow through second desiccant column 18, passing over heater 82, contained therein, which may be energized.

In the illustrated embodiment, the heater is turned on after the regneration cycle has been initiated for five seconds and remains on for approximately two minutes during which time the dired air is heated removing moisture from baffles 50. Approximately thirty seconds before regneration is completed the heaters are turned off to allow the column to cool down preventing transfer of heat to the discharge plenum.

The small flow of dry air is sufficient to remove any water which was collected by the desiccant material and baffle assemblies 50 contained therein from the previous passage of air therethrough, thereby regenerating it and continuously flowing through the exhaust outlet 70 to atmosphere. After a specific period of time, such as for example, 2.5 minutes in a particular application, damper 56 is alternated to its second position as shown in phantom in FIG. 1. Dampler 56 and exhaust doors 74 and 76, are positioned to cause air flow through first desiccant column 16 while blocking ambient air flow through second desiccant column 18.

Exhaust outlet 70 is then closed, forcing all the ambient air flow through first desiccant column 16, and exhaust outlet 72 is opened to atmosphere, allowing regenerative air to flow into second desiccant column 18 past heater 82 and out of housing 12 through exhaust opening 72. In the case of cooling the controlled space, less energy will be consumed because less energy will be required to raise or lower the temperature of the air due to reduction in the air's water load.

The present embodiment may also be employed for use with central heating or air conditioning systems in which the device is placed within the cool air return path operating on the furnace or air conditioner suction side eliminating blower 14. In this configuration a small blower capable of delivering from 10 to 20 percent of the system flow is employed to supply the regeneration air which is taken from the conditioned air run downstream of the central system.

The present device reduces energy consumption by utilizing the heat of adsorption retained on the desiccant material to facilitate regeneration. In addition, heat is applied to air already dried passing through the desiccant columns 16 or 18 alternately after the water load has been removed from the air so that regeneration time equals absorption time.

The cycle of operation of the present device is automatic and continuous for the delivery of dry air to the discharge plenum 46 and the recirculation of some of the dry air for regeneration and dehydrating the desiccant material within the respective perforated desiccant baffle assemblies 50.

The use of the present dual columned system alternately utilizing the desiccant contained within a pair of desiccant columns 16 and 18 for drying the air and for alternately drying the desiccant material is a continuous process.

This invention may be further developed in the scope of the following claims. Accordingly, the above specification is to be interpreted as illustrative of only a single operative embodiment of this invention, rather than in a strictly limited sense.

I now claim:

1. A method of drying air for use with a dehumidifier or dehydrator, comprising the following steps:
    (a) forcing ambient air at a low static pressure through an inlet into a housing;
    (b) means directing said ambient air into one of a pair of opposed desiccant columns, contained within said housing;
    (c) intermittently directing said ambient air into the other of said desiccant columns before said desiccant column approaches saturation and before said desiccant column loses the heat of adsorption contained therein;
    (d) passing said ambient air both over the surfaces of a plurality of spaced laterally staggered baffles containing a desiccant, within said columns, and through said spaced baffles, drying said ambient air;
    (e) creating a back pressure in a discharge plenum of said housing by directing dry air into said discharge plenum and a large portion thereof out through at least one restricted outlet;
    (f) directing a portion of said dry air received in said discharge plenum into said other desiccant column;
    (g) directing said portion of dry air both over the surfaces of said spaced desiccant baffles, within said other desiccant columns, and through said spaced baffles, within said other desiccant column, regenerating the desiccant in said baffles; and
    (h) directing the air received from said opposed desiccant column of said housing.

2. Method of drying air defined in claim 1, wherein the pressure drop associated with forcing air through said desiccant is a relatively small percentage of the static operating pressure.

3. The method of drying air defined in claim 1, wherein said ambient air is alternately and intermittently rapid cycled into one of said desiccant columns in intervals of approximately 2.5 minutes per column.

4. The method of drying air defined in claim 1, wherein said ambient air is forced through said inlet into said housing at relatively low static pressure;

5. The method of drying air as defined in claim 1, wherein a portion of said dry air in said discharge plenum is heated as it enters said opposed desiccant column for regeneration of said column by an electric heating means providing the impetus whereby regeneration time is not greater than adsorption time and said heat from said heating means is prevented from heating said other portion of dry air contained within said discharge plenum.

6. A method of drying air utilizing an apparatus having two desiccant beds, each desiccant bed having a minimal pressure drop and insulated from the other desiccant bed, the method comprising:
    (a) circulating ambient air to be dried through a first desiccant bed in said apparatus, wherein the desiccant is substantially at ambient temperature and drying the air;
    (b) circulating a first predetermined volume of the dried air from said first desiccant bed out of said apparatus;
    (c) recirculating a second predetermined volume of the dried air from said first desiccant bed through a heat collecting filter to a heater, and heating the dried air;
    (d) circulating the dry heated air to a second desiccant bed having moisture absorbed therein, thereby heating said second desiccant bed and removing the moisture therefrom;
    (e) circulating the air from said second desiccant bed outside to a controlled space;
    (f) discontinuing the heating of said recirculated dried air while continuing to recirculate the dried air through said second desiccant bed, thereby cooling said second desiccant bed to substantially ambient temperature;
    (g) recirculating the ambient air to be dried through said second desiccant bed before said first desiccant bed approaches saturation, and drying the ambient air;

(h) circulating said first predetermined column of the dried air from said second desiccant bed out of said apparatus;

(i) recirculating said second predetermined volume of the dried air through a heat collecting filter to a heater, thereby heating the dried air;

(j) recirculating said second predetermined volume of the dried heated air through said first desiccant bed, heating said first desiccant bed and removing moisture therefrom; and (k) intermittently repeating the cycle through said first and second desiccant beds before the desiccant beds approach saturation.

7. The method of drying air defined in claim 6, including reflecting the heat generated by said heaters into the desiccant bed to be regenerated by locating the heater in said apparatus between said desiccant bed and said heat collecting filter, thereby limiting the heating of said first predetermined volume of the dried air circulated out of said apparatus.

8. The method of drying air defined in claim 6, wherein the air is alternately and intermittently cycled between said first and second desiccant beds before the saturation of a desiccant bed reaches thirty percent.

9. A moisture control device comprising:

an enclosed housing including an inlet and at least one outlet;

opposed first and second desiccant columns on each side of said inlet and outlet;

a discharge plenum located between said outlet and said opposed desiccant columns;

said inlet and discharge plenum communicating through said desiccant columns;

a valve damper means supported within said housing having a portion directing air received from said inlet into one of said desiccant columns in a first position and into the other opposed desiccant column in a second position;

damper actuating means intermittently positioning said valve damper means between said first and second positions to alternately and intermittently direct air into one of said first and second desiccant columns;

blower means providing pressurized air through said inlet;

heater means, positioned within each of said desiccant columns in the air path therein, adapted for heating the dehydrated air passing through said column, rendering said dry air more hydroscopic for rapid regeneration of said desiccant columns;

at least one heat collecting baffle assembly of heat collecting material positioned within each column between said heater means and said discharge plenum preventing radiation of said heat to said dry air in said discharge plenum;

said desiccant columns each comprising baffles of desiccant material creating a low pressure drop through said desiccant column;

valve means in said housing for alternately directing air received from said discharge plenum through said other opposed desiccant column, out of said housing;

said valve damper means and damper actuating means alternately and intermittently directing said air into one of said desiccant columns, into said discharge plenum, and a large portion of said air out of said outlet;

said outlet a restricted opening creating a back pressure in said discharge plenum and directing a portion of the air received in said discharge plenum into said other opposed desiccant column; and said valve means directing said portion of air received from said opposed desiccant column out of said housing.

10. The moisture control device defined in claim 9 wherein said desiccant and heat collecting baffles are removeably mounted within said first and second desiccant columns.

11. The moisture control device defined in claim 9, wherein said heat collecting baffles contain a heat collecting material being carbon.

12. The moisture control device defined in claim 9, wherein each of said desiccant baffles includes a hollow enclosure of wire mesh screening and a desiccant material being of particular form and loosely netted in each baffle, and each of said heat collecting baffles includes a hollow enclosure of wire mesh screening and a heat collecting material being of particular form and loosely netted in each baffle.

13. The moisture control device defined in claim 9, wherein said valve means further includes first and second exhaust outlets, first and second pivotal exhaust doors mounted within said housing, and a valve linking means for linking said first and second pivotal doors to said valve damper.

14. A moisture control device, comprising: an enclosed housing having an inlet opening into at least two insulated air passages, a desiccant bed located within each of said passages having loosely packed desiccant material providing a relatively low pressure drop across said desiccant beds, said passages each communicating with an outlet plenum in said housing, a heater located in each of said passages between said desiccant bed and said outlet plenum, a heat collector located in each of said passages between said heater and said outlet plenum, said heaters and said collectors permitting the passage of air through said passages, a valve damper alternately closing the passage of air into said inlet opening of one of said passages, circulating means directing air into one of said passages as directed by said valve damper, said outlet plenum including at least one restricted outlet creating a back pressure in said outlet plenum and directing a first portion of the air received from one of said passages into the opposed passage through said collector and heater into the opposed desiccant column and a valve means directing said portion of air received from said opposed desiccant column out of said housing.

15. The moisture control device defined in claim 14 wherein said desiccant and said heat collectors are removably mounted within said first and second desiccant beds.

16. The moisture control device defined in claim 14, wherein said heaters include a pair of heat strips each producing heat in the range of 2000 to 1500 watts, approximately.

17. The moisture control device defined in claim 14, wherein said desiccant columns contain a desiccant material being activated alumina.

18. The moisture control device defined in claim 14, wherein said heat collectors contain a heat collecting material being carbon.

19. The moisture control device defined in claim 14, wherein each of said desiccant columns contains desiccant baffles having a hollow enclosure of wire mesh screening and a desiccant material being a particular form and loosely netted in each baffle, and each of said heat collectors includes a hollow enclosure of wire mesh screening and a heat collecting material being a particular form and loosely netted in each baffle.

20. The moisture control device defined in claim 14, wherein said valve means further includes first and second exhaust outlets, first and second pivotal exhaust doors mounted within said housing, and a valve linking means for linking said first and second pivotal doors to said valve damper.

21. The moisture control device defined in claim 14 further comprising a damper actuating means intermittently pivoting said valve damper between a first pivotal position and into the other opposed desiccant bed in a second pivotal position.

22. The moisture control device defined in claim 21 wherein said damper actuating means includes a cam timer motor pivoting said valve damper between said first and second positions in relatively short intervals of approximately 2.5 minutes.

23. A moisture control device comprising:
an enclosed housing including an inlet and at least one outlet;
opposed first and second desiccant columns on each side of said inlet and outlet;
a discharge plenum located between said outlet and said opposed desiccant columns;
said inlet and discharge plenum communicating through said desiccant columns;
a valve damper means supported within said housing having a portion directing air received from said inlet into one of said desiccant columns in a first position and into the other opposed desiccant column in a second position;
damper actuating means intermittently positioning said valve damper means between said first and second positions to alternately and intermittently direct air into one of said first and second desiccant columns, said damper actuating means includes a cam timer motor positioning said valve damper between said first and second positions in relatively short intervals of approximately 2.5 minutes;
blower means providing pressurized air through said inlet;
heater means, positioned within each of said desiccant columns in the air path therein, adapted for heating the dehydrated air passing through said column, rendering said dry air more hydroscopic for rapid regeneration of said desiccant columns;
said desiccant columns each comprising baffles of desiccant material creating a low pressure drop through said desiccant column;
valve means in said housing for alternately directing air received from said discharge plenum through said other opposed desiccant column, out of said housing;
said valve damper means and damper actuating means alternately and intermittently directing said air into one of said desiccant columns, into said discharge plenum, and a large portion of said air out of said outlet;
said outlet having a restricted opening creating a back pressure in said discharge plenum and directing a portion of the air received in said discharge plenum into said other opposed desiccant column; and
said valve means directing said portion of air received from said opposed desiccant column out of said housing.

* * * * *